United States Patent Office 3,444,489
Patented May 13, 1969

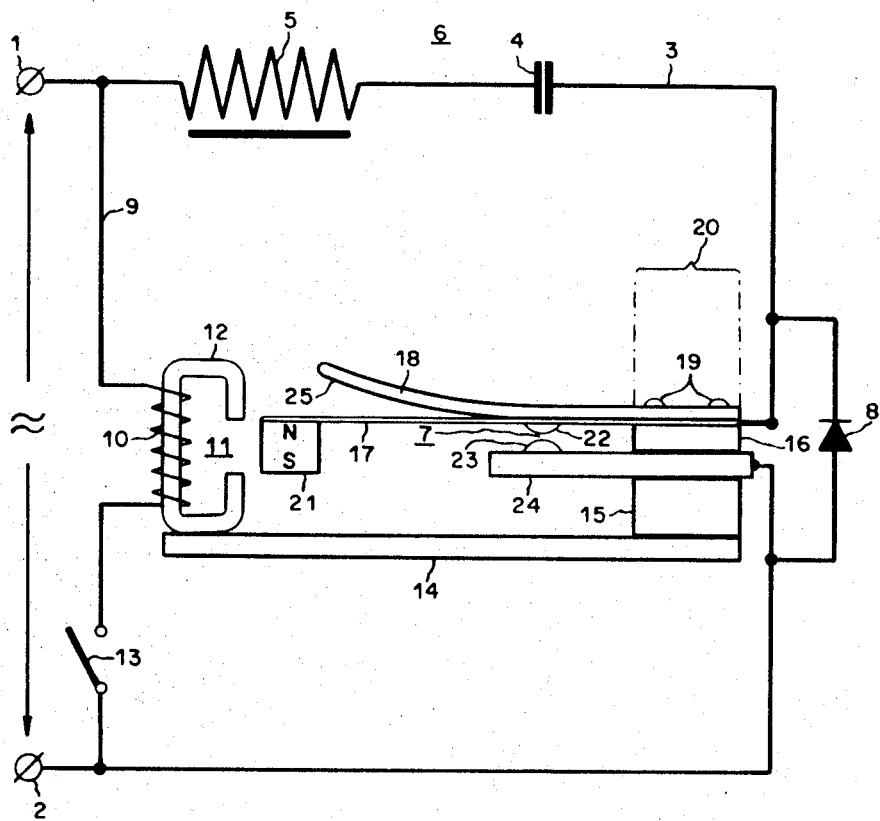

1

3,444,489
OSCILLATORY CIRCUIT WITH VIBRATORY SWITCH
Alex Nyfeler, Baar, Zug, Switzerland, assignor to Electrometre S.A., Zug, Switzerland, a body corporate of Switzerland
Filed Jan. 9, 1967, Ser. No. 607,987
Claims priority, application Switzerland, Jan. 13, 1966, 458/66
Int. Cl. H01h 51/34
U.S. Cl. 335—87     16 Claims

ABSTRACT OF THE DISCLOSURE

A vibratory switch arrangement for delivering controlled pulses to a transmission network having an oscillatory contact-carrying blade electromagnetically driven and means including a shaped stop for controlling the period and transient behavior of the switch.

---

This invention relates to vibratory electrical switching mechanisms and more particularly to means for controlling the period, transient behavior and other actions of said switching mechanisms. Related matter is found in applicant's copending application filed concurrently herewith, bearing Ser. No. 607,928, filed Jan. 9, 1967 and entitled "Vibratory Switching Mechanism."

Known remote control equipment use as their long distance channels, sections of public electric supply networks. The transmitted signals are superimposed on the mains voltage, usually an alternating current voltage, in the form of audio frequency pulses. In some known forms of apparatus, such pulses are generated with the aid of an electrical oscillatory circuit which is connected to the energy supply network by a feeler contact at a predetermined frequency and phase relationship to the mains AC voltage. Each time the circuit is connected, a suppressed oscillation takes place at a suitable audio frequency.

It is known that in order to obtain a high audio frequency energy level per pulse, the oscillatory circuit must be connected to the mains voltage when the latter is at a peak value of one polarity and disconnected from the circuit during the peak value of opposite polarity. This gives the capacitor of the oscillatory circuit its greatest possible charge relatively to the transient value of the mains voltage prevailing at the time of connection.

In order to obtain simple constructions which can be mass produced, the contact switch used is preferably made up of contact means with an oscillating blade which is vibrated by the magnetic alternating field of an electromagnet connected to the main AC voltage on which the audio frequency pulses are to be superimposed; a feeler contact is closed at each oscillation of the blade. Contact means of this type raise many different problems, partly because of the relatively high load on the contact and partly because of the considerable noise concomitant with the use of such contacts. However, if a given on-off ratio is to be observed—i.e. the ratio in an oscillating period of the time during which the feeler contact is closed to the time during which it is open, special mechanical measures are necessary in the contact device in order to give the audio frequency pulses a high energy content.

As a solution to the above problems, the invention provides a combination of mechanical and electrical means which make use of the technique, known per se, of shortening the free spring length of a contact spring with increasing deflection. This is accomplished by progressively pressing the spring against a contact arm having a specific curvature, thereby counteracting the tendency of the contacts to chatter.

The invention is accordingly directed to improvements in oscillatory circuit arrangements wherein an oscillating blade contact element having a contact is connected to an AC voltage network in series with an electrical oscillatory circuit, the network also acting as a voltage source to feed an electromagnet which vibrates the oscillating blade. According to the invention, the oscillating blade, which carries a permanently magnetized oscillating mass, lies against a stationary curved stop with a slight bias when in the state of rest, and touches the curved stop at a tangent at least approximately at the place where the contact element is fastened. In addition, a diode is connected in parallel with the blade contact.

Details of an exemplary circuit arrangement according to the invention will now be given with the aid of an example illustrated in the sole figure of the drawing, which is a schematic diagram of an oscillating switch with an oscillating blade contact in a circuit arrangement.

In the figure, 1 and 2 are terminals which are connected to an AC voltage network, e.g. to a single phase line and the neutral lead thereof. Along a main current path 3 lies an oscillatory circuit 6 comprising a capacitor 4 and a choke coil 5, these being in series with an oscillating switch 7. The switch 7 is electrically bridged by a diode 8. A secondary path 9 for the current, branching off immediately after the terminals 1 and 2, contains the energizing coil 10 of an electromagnet 11 having a core 12. A switch 13 serves to close the path 9.

The core 12 of the electromagnet 11 is fixed to a supporting frame 14 which further carries an oscillating blade 17 by means of insulating intermediate members 15 and 16, and a curved stop 18. The stop 18 is rigidly joined to the frame 14 and blade 17 at a clamping site 20 by means of fastening element 19.

The end of the blade 17 opposite the clamping point 20 is provided with an oscillating mass 21 which is preferably permanently magnetically polarized, i.e. in the form of a permanent magnet. Also attached to the blade 17 is a contact element 22 of the switch 7, while a contact member 23 of the same switch is held by a yoke 24 which is in turn fixed to the supporting frame 14. The contact spacing of the switch 7, i.e. the distance between the element 22 and the member 23 when the oscillating blade 17 is at rest, is only a few tenths of a millimeter, preferably from 0.2 to 0.3 mm.

By suitably attaching and shaping the stop 18 and blade 17 one can ensure that the blade 17, when in the state of rest, will lie against a curve 25 in the stop 18 with a slight bias so as to form a tangent to the curve 25 with a point of contact near the place where the contact element 22 is fixed.

Correct choice of the contact spacing and of the position of the point or rather line of contact between the blade 17 at rest and the curved stop 18 is of the utmost importance to the action of the oscillating blade contact.

The curve 25 is arcuate starting at least from its point of contact with the resting blade 17 and extending towards its free end. The arcuate shape is not only easy to form, but has proved to be favorable to the operation of the oscillating system. This is not to say, however, that other geometrical shapes for the curve 25 would not produce favorable results.

The contact element 22 generally has a fastening element such as a rivet head or the like (not shown) on the opposite side of the blade spring 17. It is desirable to provide a recess (not shown) in the stop 18 to accommodate the rivet head so that the spring 17 can in fact lie flush against the curved stop 25 at the place where the contact element 22 is attached.

The oscillating mass 21 on the blade 17 is preferably magnetically polarized in such a way that the main magnet axis points in the oscillating direction of the blade 17, that is to say, with the north pole at the top and the south pole at the bottom or vice versa in the arrangement shown in the drawing. The pole arrangement of the electromagnet 11 shown in the drawing corresponds to this magnetic orientation of the mass 21.

Ceramic magnetic materials or resin bonded permanent magnetic powder can advantageously be used as the magnetic material for the oscillating mass 21. For manufacturing reasons, it may be advantageous for the mass 21 to be attached to the blade 17 at one side as illustrated, for example by means of bent portions of the blade (not shown), using an adhesive or the like. But if resin bonded powdered magnetic materials are used, it is possible to cast the mass 21 directly onto the blade 17, in which case the mass can of course be arranged symmetrically in relation to the blade 17. A final possibility is for the mass 21 to be moulded onto the blade 17 during its manufacture, from the same material as the blade provided that this material can be permanently magnetically polarized.

To help the blade 17 to start oscillating in the field of the electromagnet 11, the neutral zone between the poles of the magnet 11 may if necessary be asymmetrically offset from the magnetically neutral zone of the mass 21 in the oscillating direction of the blade 17, preferably towards the stop 18, i.e. upwards in the figure.

If the mass 21 is fixed to one side of the blade 17 in the arrangement illustrated, the magnetic attractive forces will in any case produce a slight deformation in the resting blade 17, so that the pole of the mass 21 remote from the blade 17 will move slightly nearer to the parallel limb of the magnet 11 opposite it. This will similarly produce an unsymmetrical configuration of the permanent magnetic field which will encourage the starting of the oscillatory movement.

To simplify the description that will now be given of the operation of the circuit arrangement, the frequency of the mains AC voltage at the terminals 1 and 2 will be taken as being 50 cycles per second. The remarks which follow will naturally apply equally well to 60 cycles per second or any other mains frequency.

The oscillating system made up of the blade 17 and mass 21 may, for example, be tuned so that the duration of an oscillating period of the blade is twice as long as that of a period of the main AC voltage supplied to the coil 10 of the electromagnet 11 when the switch 13 is closed.

The oscillating time of the blade 17 is in this example 40 milliseconds, its frequency thus being 25 cycles per second; it is therefore in sub-harmonic resonance to the main frequency. A different tuning of the system is of course possible, for example such that the frequency of the system is a harmonic of the frequency of the main AC voltage exciting the electromagnet 11.

In the half oscillation of the system during which the blade 17 is approaching the curved stop segment 25, the effective spring length of the blade 17 is constantly shortened depending on the amplitude of its oscillation, and the spring constant of the blade 17 is progressively enlarged, resulting in a shortening of the oscillating time during the half oscillation in question. During the other half oscillation, the switch 7 is closed after the blade 17 has travelled a relatively short distance, because of its very small contact spacing, and is then kept closed for nearly the whole duration of the free half oscillation of the blade 17.

Since the two half oscillations making up a period of the system are of different lengths one can, by suitable mechanical tuning, easily ensure that the switch 7 is closed for exactly half a period of the blade's oscillation or at the most for less than one quarter of a period thereof longer, thus preferably for 20 milliseconds in the example. This corresponds to the duration of a period of the 50 cycle per second main AC voltage. By simple phase balancing, which can be done in known manner by mechanical or electrical means, the times when the switch 7 close and open can be made to coincide with the occurrence of similar peak values of the main voltage. Thus, the switch 7 will close and open alternately at the successive main voltage maxima of the same polarity, e.g. at the peak values of the positive half waves of mains voltage, so long as the switch 13 is closed.

The poles of the diode 8 must be such that the diode becomes conductive at all those half waves of the main voltage which have opposite polarity to the half waves at which the blade contact opens or closes, i.e., for example, at the occurrence of negative half waves. In this way the diode 8 discharges current from the switch 7 while the latter is closed and the diode is conductive, and also charges capacitor 4 to the negative peak value of the main voltage when the switch 7 is open.

By virtue of the construction described and the tuning of the components of the circuit arrangement, there is a charge-reversing current impulse of the greatest possible amplitude for this circuit arrangement delivered to the capacitor 4 each time the switch 7 is closed. The impulse incites the oscillatory circuit 6 to carry out suppressed oscillations at its own frequency, which is preferably within the audio frequency range, e.g. between 400 and 600 cycles per second. These audio frequency oscillations act as remote control signals which pass through the terminals 1, 2 into the energy distributing network.

It has been mentioned above that the blade 17 must rest against the stop 18 with a slight bias when in the state of rest. The advantage of this is that any vibrations or outside magnetic fields which may accidentally act on the blade 17 cannot readily cause it to oscillate and thereby close the switch 7.

The use of the curved stop 18 results in an unsymmetrical relationship between the two half waves of the blade's oscillation which is necessary for timing the opening and closing of the switch 7 relatively to the main voltage. This is accomplished without the lack of symmetry substantially increasing the amount of noise—the blade 17 comes into contact with the curve 25 steadily and therefore "softly." Moreover, the curved stop 18 produces a substantial flattening out of the bending tensions in the blade 17 during the passive half wave, i.e. while it is approaching the curve 25, particularly near the place where the contact element 22 is fastened.

The arrangement chosen for the oscillating blade also has the advantage that the frequency of the blade alone need not be provided for very accurately during manufacture, since the oscillating time of the blade 17 may also be affected by the geometry of the curved stop 25; this provides a very simple means of adjustment, since the stop 18 can easily be rebent by known adjusting implements if the manufacturing tolerances should make slight resetting necessary. If the oscillating mass 21 is additionally made of resin bonded magnetic material, which can easily be worked, this will provide another very simple method of tuning, by eroding material from the mass 21, e.g. by shaving or filing it.

The fact that the diode 8 is in parallel with the switch 7 means that the oscillatory circuit 6 can always be connected with the greatest possible potential difference at the capacitor 4 without any mechanical complication of the oscillating blade device. The energy content of the audio frequency pulses generated with the circuit arrangement described is therefore particularly large.

It will be seen from the arrangement illustrated that a sequence of audio frequency pulses is generated so long as the switch 13 is closed. The entire arrangement including the blade contact constitutes a particularly simple signal emitter such as can be provided, e.g. at numerous consumption measuring locations within an energy supply network in order to supply information about energy consumption to a central control station. Within the framework of an inquiry system for consumption meters to ascertain individual consumption of public consumer supplies, the switches 13 of the circuit arrangements may, for example, be closed in a given time sequence by long distance orders, thus causing the emitters to give out audio frequency pulses. The method of coding and evaluating the information transmitted by such means is known.

In the practice and study of the invention, modifications will undoubtedly occur to those skilled in the art. The invention is thus not limited to the specific mechanisms and processes herein shown but departures may be made therefrom within the scope of the accompanying claims without departing from the principles of the invention and without sacrificing its chief advantages.

What is claimed is:

1. In an electrical oscillatory circuit adapted to be connected to an AC voltage distributing network and having a vibratory electrical switch adapted to receive switch actuating energy from said network, said vibratory electrical switch is comprised of a stationary contact element, an oscillating blade having a fixed end and a free end, mounting means for the fixed end of said oscillating blade, a contact element mounted on said oscillating blade in alignment with said stationary contact element, a permanently magnetized oscillating mass mounted on said oscillating blade, and means responsive to the AC voltage distributing network to oscillate the oscillating blade, a stationary curved stop arranged in the plane of oscillation of said oscillating blade, said curved stop having a fixed end and a free end, said fixed end rigidly connected to the fixed end of the oscillating blade at the blade mounting means, said oscillating blade being arranged to contact said stop at a slight bias when in the state of rest at a curved portion of said stop in a tangential relationship therewith in the region of said contact element.

2. An arrangement according to claim 1, wherein the oscillatory circuit further comprises a diode connected in parallel across the vibratory electrical switch.

3. An arrangement according to claim 1, wherein said curved stop is of arcuate shape.

4. An arrangement according to claim 2 wherein said curved stop is of arcuate shape.

5. An arrangement according to claim 4 wherein the contact members are arranged with a spacing of from 0.2 to 0.3 millimeter therebetween.

6. An arrangement according to claim 4 wherein the oscillating mass is formed of ceramic permanently magnetized material.

7. An arrangement according to claim 4 wherein the oscillating mass is formed of resin-bonded, permanently magnitized powder.

8. An arrangement according to claim 4 wherein the oscillating mass is cast onto said blade.

9. An arrangement according to claim 4, wherein the oscillating mass is moulded to said blade out of the same material as said blade.

10. An arrangement according to claim 4, wherein said blade is configured to resonate at a sub-harmonic frequency of said AC voltage network.

11. An arrangement according to claim 4, wherein the frequency of the blade is half the frequency of the AC voltage network.

12. An arrangement according to claim 4, wherein said switch is closed for exactly half the duration of an oscillating period of said blade.

13. An arrangement according to claim 4, wherein said switch is configured to open and close in synchronism with the occurrence of peak values of the same polarity of said network voltage.

14. An arrangement according to claim 4, wherein said diode is polarized such that the diode becomes conductive during all those half wave periods of the network voltage which have a polarity opposite to that occurring when said switch opens or closes.

15. An arrangement according to claim 4, wherein the frequency of oscillation of said blade is a harmonic of the frequency of said AC voltage network.

16. An arrangement according to claim 4, wherein said AC network includes means for interrogating consumption meters connected to said networks to ascertain individual consumption of public consumer supplies.

References Cited

UNITED STATES PATENTS

| | | | |
|---|---|---|---|
| 2,073,913 | 3/1937 | Wigan | 335—87 |
| 2,606,259 | 8/1952 | Huetten. | |
| 3,138,745 | 6/1964 | Slater | 335—94 |
| 3,221,120 | 11/1965 | Mooney | 335—94 |

BERNARD A. GILHEANY, *Primary Exxaminer*

H. BROOME, *Assistant Examiner.*

U.S. Cl. X.R.

200—166